Patented Mar. 26, 1935

1,995,965

UNITED STATES PATENT OFFICE 1,995,965

PROCESS OF CONCENTRATING DILUTE AQUEOUS WATER-SOLUBLE FATTY ACIDS

Joseph G. Davidson, New York, and Joseph J. Schaefer, Niagara Falls, N. Y., assignors to Carbide and Carbon Chemical Corporation, a corporation of New York No Drawing. Application July 25, 1930,
Serial No. 470,763

4 Claims. (Cl. 260—122)

The present invention relates to a process of concentrating dilute aqueous water-soluble fatty acids by extraction with a particular solvent and distillation of the extract to recover a concentrated acid.

It is known that concentrated acetic acid can be made by extracting aqueous solutions of the acid with certain organic solvents, and then fractionally distilling the extract. Many solvents have been proposed for use in such processes. The objective is, of course, to extract the acid selectively, and to produce an extract from which the solvent and acid can be readily recovered. Extraction processes have met with some degree of success, but so far as we are aware, it is impossible, by a single distillation of an extract made with any solvent heretofore proposed, to reach an acid concentration higher than about 80%. The necessity for reprocessing the fractions first formed has proved a serious drawback.

We have discovered that isopropyl ether, $(CH_3)_2CH—O—CH(CH_3)_2$, is a very advantageous solvent with which to concentrate acetic acid by extraction. With this agent there can be produced an extract containing practically all of the acetic acid originally present in the dilute acid treated, but containing a minor portion only of the water initially mixed with the acid. If this extract is now distilled, a highly important and advantageous effect is observed, viz., that the vapor phase of the boiling liquid is practically free from acetic acid.

By distilling the extract in an efficient rectifying apparatus, the water present first distills off with a part of the ether as a constant-boiling mixture (B. P. 61° C.–62° C.). The excess of isopropyl ether then comes over in practically pure form. Finally, only acetic acid remains, with a fraction of one percent of water. The strong acid may of course be distilled for the separation of any non-volatile or high boiling impurities. The distillation of the ether is complete at about 69° C., and the temperature of the liquid in the still then rises rapidly to the boiling point of glacial acetic acid. The composition of the various fractions will of course vary with the care exercised, with the efficiency of the apparatus, and with the composition of the dilute acid treated. Under favorable conditions, the fraction which distils at constant temperature contains not more than about 0.01% of acetic acid, while the isopropyl ether which constitutes the next fraction contains even less acid. Acetic acid of more than 99% can be produced in a single distillation with negligible losses of the acid.

When the constant-boiling mixture condenses, the condensate separates into two layers. The lower aqueous layer is substantially free from acetic acid and isopropyl ether, and can be discarded. The upper layer is water-saturated isopropyl ether, and should be returned to the process.

We have also discovered that isopropyl ether can be used with great advantage in concentrating aqueous acetic acid without resorting to a liquid-phase extracting operation. By bringing isopropyl ether into contact with the dilute acid and heating the latter to ebullition, the water is removed as a constant-boiling mixture with the ether; and if the process is continued, the temperature being eventually raised to insure the expulsion of all the isopropyl ether, a residue of glacial acetic acid is obtained. The distillate, on condensation, forms two layers, as in the modification of the process in which extraction is used. The ethereal upper layer can be separated continuously or intermittently, and returned to the process.

The extraordinary effect obtainable with isopropyl ether, whereby heating dilute aqueous acetic acid in the presence of this substance gives a vapor phase containing water but almost free from acetic acid, can obviously be utilized in many different ways, and the methods described herein are merely illustrative, and by no means exhaust the possibilities. The isopropyl ether can be used in conjunction with other separating media, and such steps and processes as are particularly referred to herein can be used in conjunction with other appropriate steps for concentrating, purifying or otherwise treating dilute or impure acetic acid.

Isopropyl ether has an additional advantage over many other agents which have been proposed for concentrating acetic acid in that it is in a practical sense, chemically inert toward the acid. This circumstance minimizes the formation of by-products during the process.

Other organic acids homologous with acetic, for example formic and butyric acids, can also be concentrated by the use of isopropyl ether. While the specific temperatures and proportions naturally differ when different acids are processed, the procedure is generally the same, and we deem the foregoing discussion of the treatment of acetic acid to be sufficient to enable those skilled in the art to practice the invention as applied to other acids.

We claim:—

1. A process of concentrating a dilute aqueous water-soluble fatty acid which comprises extracting the dilute acid with isopropyl ether, distilling the extract, and recovering said ether from the distillate and the concentrated acid from the distillation residue.

2. A process of concentrating dilute aqueous acetic acid which comprises extracting the dilute acid with isopropyl ether, distilling the extract, and recovering said ether from the distillate and concentrated acetic acid from the distillation residue.

3. A process of concentrating dilute aqueous water-soluble fatty acids which comprises extracting the dilute acid with isopropyl ether, fractionally distilling the extract, and collecting the acid as a still residue.

4. A process of concentrating dilute aqueous acetic acid which comprises extracting the dilute acid with isopropyl ether, fractionally distilling the extract, and collecting the acid as a still residue.

JOSEPH G. DAVIDSON.
JOSEPH J. SCHAEFER.